United States Patent [19]

Magrini

[11] Patent Number: 5,647,247
[45] Date of Patent: Jul. 15, 1997

[54] SINGLE HANDLE CONTROL MECHANISM

[75] Inventor: Sergio Magrini, Modena, Italy

[73] Assignee: New Holland North America, Inc., New Holland, Pa.

[21] Appl. No.: 527,963

[22] Filed: Sep. 14, 1995

[30] Foreign Application Priority Data

Sep. 16, 1994 [IT] Italy ................... TO9400722

[51] Int. Cl.$^6$ ............................................. G05G 9/047
[52] U.S. Cl. ..................... 74/471 XY; 137/636.2
[58] Field of Search .................. 74/471 XY; 137/636.2

[56] References Cited

U.S. PATENT DOCUMENTS

| | | | |
|---|---|---|---|
| 2,762,234 | 9/1956 | Dodd | 74/471 XY |
| 3,172,300 | 3/1965 | Schyneider | 74/471 XY |
| 3,611,826 | 10/1971 | Fisher et al. | 74/471 XY |
| 4,112,976 | 9/1978 | Sala | 74/471 XY |
| 4,285,250 | 8/1981 | Iizuka | 74/473 |

*Primary Examiner*—Allan D. Herrmann
*Attorney, Agent, or Firm*—Larry W. Miller; John W. Stader; Frank A. Seemar

[57] ABSTRACT

A single handle control mechanism has two shafts for connection to two independently operable mechanisms, such as hydraulic valves controlling the position of hydraulic actuators in an agricultural tractor. The shafts are operable to rotate selectively either individually or in combination about a common longitudinal axis of rotation through manipulation of a handle member which is rotatable about two orthogonal axes oriented perpendicularly to the axis of rotation of the shafts. The handle member has a first roller and slot coupling for effecting the rotation of the shafts and a second roller and slot coupling for effecting the rotation of the other coaxial shaft. The slots of the first and second couplings are orthogonal to one another to resolve the rotation of the handle member into a first component for rotating the first shaft and a second component for rotating the second shaft.

13 Claims, 4 Drawing Sheets

5,647,247

SINGLE HANDLE CONTROL MECHANISM

BACKGROUND OF THE INVENTION

The present invention relates to a single handle control mechanism for selectively operating two mechanisms either individually or in combination. The control mechanism is particularly, although not exclusively, suited for use on a utility vehicle, such as an agricultural or industrial tractor.

When it is desired to control and operate two mechanisms, such as two control valves in an agricultural tractor, using a single handle, the handle is preferably operated in two different directions so as to selectively operate the two mechanisms. In a conventional single handle control, a single control lever is provided which is mounted by a pivotal connection at one end and is moveable by hand at the other end. The movements of the control lever are transmitted to two control rods by pivotal connections made from the control lever to the ends of the control rods. The pivotal connections are so arranged that the rods are at right angles to one another and movement of the control lever in one direction will operate one of the control rods while movement of the control lever in another direction at right angles to the first will operate the other of the control rods. An example of such a conventional single handle control mechanism is shown in U.S. Pat. No. 4,285,250 assigned to Kabushiki Kaisha Komatsu Seisakusho.

In as much as a single handle control mechanism of the above type requires the two control rods to be oriented at right angles relative to one another, the compactness of the arrangement is not ideal. Moreover, quite often, complicated control rod structures are needed to transmit the movement of the single control lever towards the mechanisms to be controlled.

SUMMARY OF THE INVENTION

It is, therefore, the objective of the present invention to overcome the disadvantages of prior art arrangements by providing a single handle control mechanism which is compact in design and has a simple and efficient construction.

According to the invention a single handle control mechanism is provided for selectively operating two mechanisms either individually or in combination.

The invention is characterized in that the handle control includes two shafts disposed coaxially one within the other for connection respectively to the two mechanisms, the shafts being individually rotatable about a common longitudinal axis, and a handle member mounted for rotation about two orthogonal axes which are perpendicular to the axis of rotation of the shafts.

The handle member has a first slot and follower coupling to rotate a first of the shafts and a second slot and follower coupling to rotate the second of the shafts, the slots of the first and second couplings being orthogonal to one another to resolve the rotation of the handle member into a first component to rotate the first shaft and a second component to rotate the second shaft.

Preferably the follower in each of the couplings is a roller. Preferably also the slot in each coupling is formed in the handle member. The handle member may be mounted for rotation about the two orthogonal axes of rotation thereof by means of orthogonally arranged pivotal mountings.

In certain applications of single handle controls to selectively operate two mechanisms, it is important to meet a requirement for a compact system which can operate the mechanisms through two coaxial shafts which may be of variable length according to the nature of the application. It is further a desirable feature of such a control that it should be of a simple and efficient construction which provides progressive control of each of the two mechanisms without undue effort being required of the operator to manipulate the control.

BRIEF DESCRIPTION OF THE DRAWINGS

A single handle control mechanism in accordance with the present invention will now be described, by way of example, with reference to the accompanying drawings, wherein.

DETAILED DESCRIPTION OF THE PREFERRED EMBODIMENT

Figure 1:
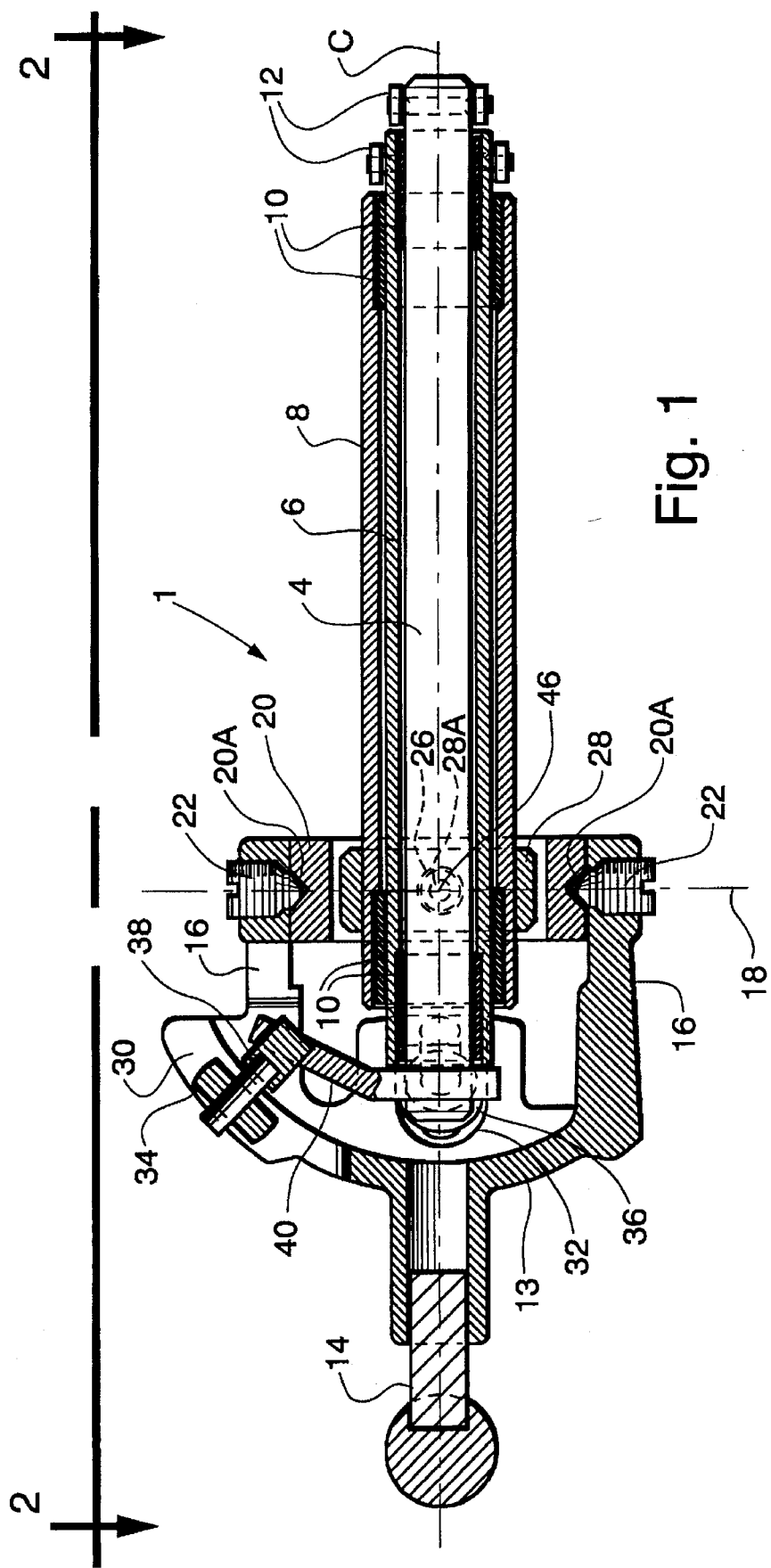
FIG. 1 is a cross-sectional side view of a single handle control according to the present invention.
Figure 2:
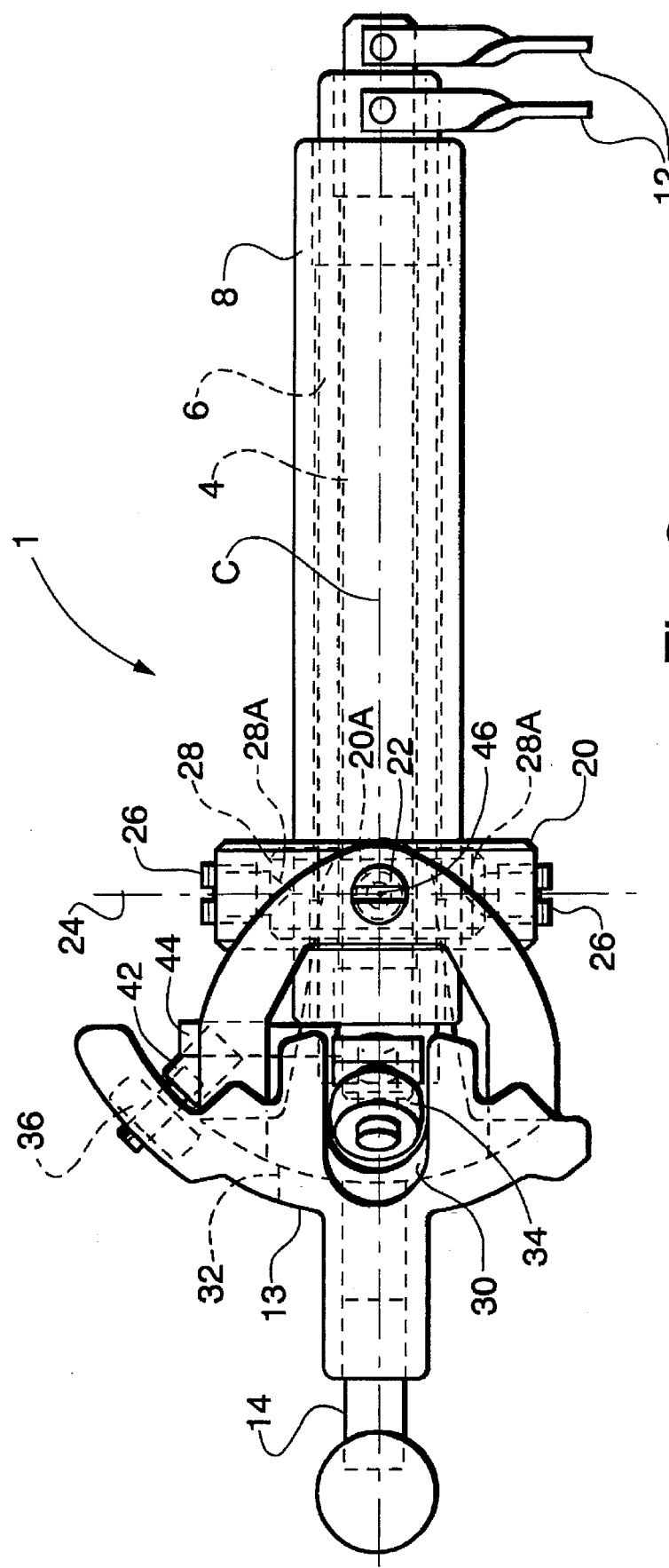
FIG. 2 is a side view taken in the direction of arrow V in FIG. 1.
Figure 4:
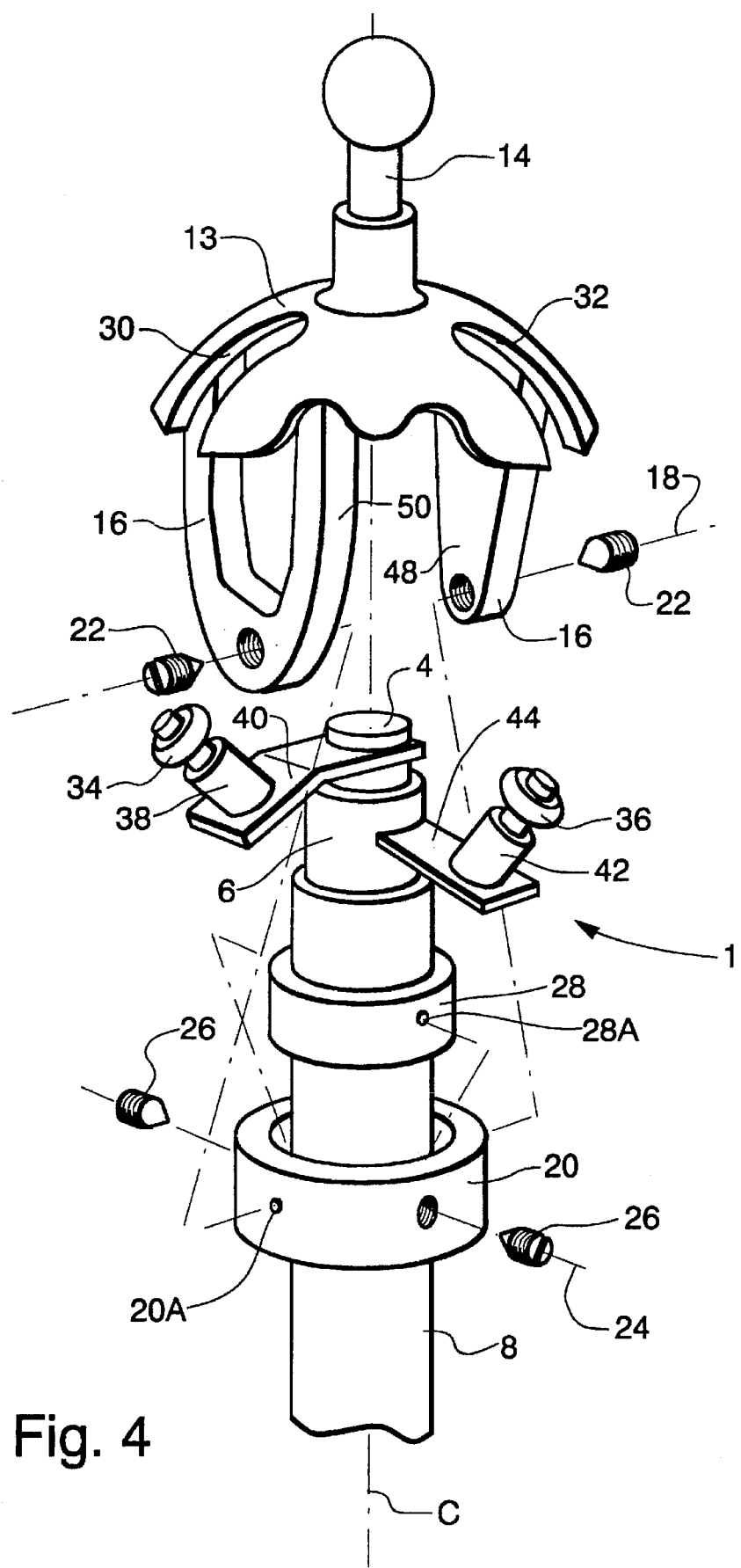
FIG. 4 is a perspective, partially exploded view of the single handle control of FIGS. 1 to 3.

Referring now to FIGS. 1, 2 and 4, a single handle control assembly 1 is shown incorporating a first inner, solid shaft 4 and a second outer shaft 6. The shafts are coaxially arranged with the inner shaft 4 rotatable within the outer shaft 6 about its longitudinal axis C. The outer shaft 6 is in the form of a sleeve surrounding the inner shaft 4 and is rotatable within a fixed housing 8 about the same longitudinal axis as the inner shaft 4. Sleeve bearings 10 are provided on the opposite ends of the shafts to rotatably support the inner shaft 4 within the outer shaft 6, respectively the outer shaft 6 within the housing 8.

The assembly is used on an agricultural machine, such as an orchard tractor for example, where the space that can be allocated to the operator controls is limited because of the narrow dimensions of the tractor. The right hand ends of the shafts 4 and 6, as seen in FIG. 1 and 2, are linked by means of rods 12 to respective conventional hydraulic valves (not shown) which operate in response to the rotation of the shafts 4 and 6. A key feature of the assembly is to be found in the particularly compact arrangement of the shafts 4 and 6 by reason of their coaxial relationship. The lengths of the shafts 4 and 6 can be of any desired size according to the particular application of the assembly 1.

A handle member 13, generally shaped as a segment of a sphere, has a manual projecting knob 14 (only partially shown) to be grasped by the operator of the handle control assembly 1. As will be seen in FIG. 1, the handle member 13 comprises two parallel oriented legs 16 by which it is mounted for rotation about a first axis 18. To this end, the legs 16 are rotatably connected to a ring member 20 by means of two threaded pins 22 which have tapered ends engaging correspondingly tapered seats 20A in the ring member 20. The pins 22 are aligned with respect to each other so as to define the axis 18.

As best can be seen from FIG. 2, the ring member 20 in turn is mounted for rotation about a second axis 24 by means of two further threaded pins 26 which have tapered ends seated into correspondingly tapered seats 28A in a second ring member 28. The ring member 28 is welded to the fixed housing 8 surrounding the shafts 4 and 6. In as much as the respective pins 22 and 26 are 90° offset from each other, the axes 18 and 24 are oriented at right angles relative to one another. Accordingly, the handle member 13 is rotatable about the two orthogonal axes 18 and 24 which are both perpendicular to the axis of rotation C of the shafts 4 and 6.

Figure 3:
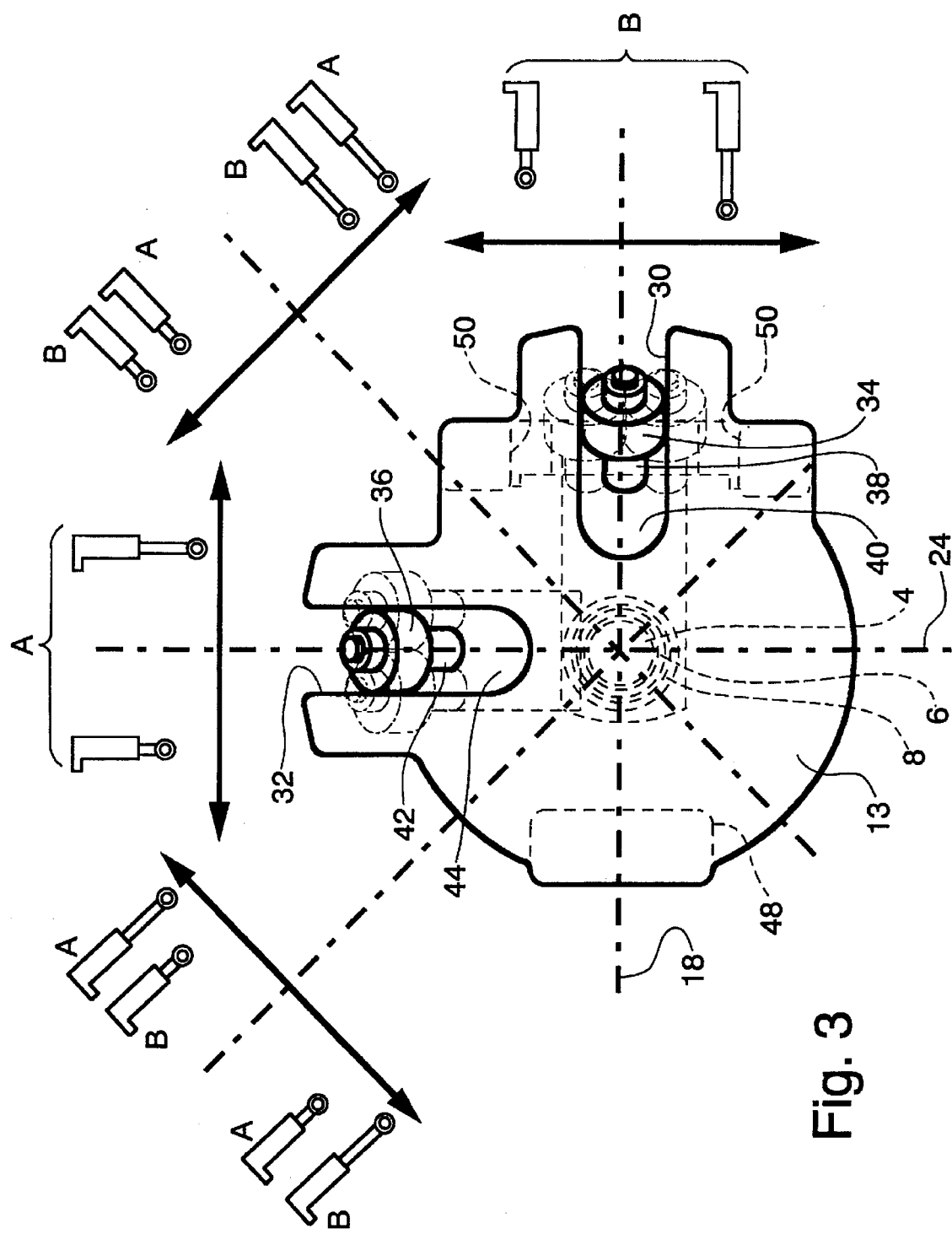
FIG. 3 shows an end view of the single handle control of FIGS. 1 and 2 visualizing the effect of the movement of the handle on a given pair of mechanisms to be controlled.

As already mentioned, the handle member 13 has a generally spherical conformation within which there are formed two slots 30 and 32 which are best seen in FIGS. 3 and 4. The two slots 30 and 32 are open at one end and are arranged at right angles to one another. The orientation of the slot 30 corresponds to the orientation of the orthogonal axis 18 and the same is true for the slot 32 relative to the axis 24. The sides of the slots 30 and 32 are engaged by part spherical rollers 34 and 36 respectively. The roller 34 is rotatably mounted on a first stub shaft 38 which is fixedly connected to an angled support member 40, in turn rigidly fixed to the inner shaft 4. The roller 36 on the other hand is rotatably mounted on a second stub shaft 42 which is fixedly connected to a straight support member 44, in turn rigidly attached to the outer shaft 6.

The stub shafts 38 and 42 are arranged such that the longitudinal axes therethrough intersect with the intersection 46 between the orthogonal axes 18 and 24. Considering on the one hand that the spherical conformation of the handle member 13 has a radius which is centered in 46 and on the other hand that the rollers 34 and 36 are arranged perpendicularly to axes running through the point of intersection 46, it will be appreciated that the rollers 34 and 36 closely follow the shape of the respective slots 30 and 32 when the handle member 13 is moved relative to the rollers 34, 36.

With specific reference to FIGS. 2 and 4, it is seen that the legs 16 are not shaped identically but that one of the legs is formed as a solid member 48 whereas the other leg is in the form of a U-shaped bracket 50. It will be appreciated that the bracket 50 is provided to by-pass the roller arrangement 34, 38, 40 in order to avoid interference in as much as the latter is located in the plane defined by the slot 30 and the pivotal connection of the legs 16 to the ring member 20.

As seen in FIG. 3, the single handle control 1 is connected, by way of example, to two hydraulic actuators A and B which control separate functional operations. As explained hereafter, the handle member 13 can be moved in an infinite range of directions to control the condition of both actuators A and B, either separately or in combination.

Rotation of the handle member 13 can be effected in either vertical direction shown by the two vertical arrows in the drawing. Such a movement causes the slot 30 to translate vertically whereby the roller 34 is moved generally vertically (shown in phantom outline) together with the slot 30 as such effecting rotation of the inner shaft 4. During such movement, which hereinafter will be referred to as a "B" rotation, the roller 36 travels along its associated slot 32 without deviating from the line 24 as seen in the top plan view of FIG. 3. Accordingly, no rotation of the outer shaft 6 will take place. Therefore, a "B" rotation results in retraction or extension of the actuator B without changing the condition of the actuator A.

In a similar manner, rotation of the handle member 13 can also be effected in either horizontal direction shown by the horizontal arrows in the drawing to move the roller 36 with the slot 32 and thereby effect rotation of the outer shaft 6. Any such rotation of the handle member 13 will be referred to as an "A" rotation. During an "A" rotation, the roller 34 will move along its slot 30 and no rotation of the inner shaft 4 will take place. Thus, an "A" rotation results in retraction or extension of the actuator A without changing the condition of the actuator B. Conclusively, by selecting the direction of rotation of the handle member 13 either horizontally or vertically, the shafts 4 and 6 can be individually selected for rotation and operation of any mechanism connected to the shafts.

Rotation of the handle member 13 furthermore can be effected diagonally as seen in FIG. 3 by reason of the rotational mounting of the handle member on the pins 22 and 26 as already explained. For example, the rotation can be a combination of an "A" and a "B" rotation to shift the rollers 34, 36 in a direction which rotates both shafts 4 and 6 in the same direction. Alternatively, the rotation can be a combination of an "A" and a "B" rotation that shifts one of the shafts 4, 6 in one direction and the other of the shafts in the opposite direction. The effects of the rotations of the handle member 13 in different combinations of rotational direction are shown diagrammatically in FIG. 3, visualizing the simultaneous retraction or extension of the actuators A and B, the extension of actuator A while actuator B is retracted or vice versa.

The effect of the roller and slot couplings constituted by the rollers 34 and 36 within their respective slots 30 and 36 is to resolve any rotation of the handle member 13 into a component to rotate the inner shaft 4 and a component to rotate the outer shaft 6. It thus will be clear that a diagonal motion of the handle member 13 under an angle of 45° effects movement of the actuators A and B by a proportional amount, either in the same direction or in opposite directions. Any movement of the handle member 13 between the diagonal direction and either the vertical or the horizontal direction, will result in a disproportional actuation of the actuators A and B, enabling to favor one actuator above the other.

An advantage of the described arrangement is that the pins 22 and 26 can be turned on their threads to reduce to zero the play between the respective elements while still maintaining a low frictional resistance whereby the handle member 13 can be smoothly moved through its required range. A locking material can be inserted into the threads to fix the pins in place.

A further advantage is that the force required to be applied to the handle member 13 to actuate the two shafts 4 and 6 simultaneously under an angle of 45° is less than the sum of the forces required to operate the shafts individually. Thus, if the two shafts 4 and 6 each require the same individual force "F" applied to the handle member 13, then assuming no loss for friction, the force required to rotate the two shafts simultaneously will be $1/\cos(45°) \times$"F", being $1.41 \times$"F".

It will be apparent that the slots 30 and 32 together with their rollers 34 and 36 constitute a pair of slot and follower couplings in which the rollers act as the followers. As an alternative, each of the rollers could be replaced by a follower such as a peg which slides within the respective slot providing the increased friction presented by the use of such pegs can be tolerated. As a further alternative, the rollers may be mounted on the handle member 13 and engage slots in the couplings attached to the shafts 4 and 6.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A single handle control mechanism for selectively operating two independently operable mechanisms either individually or in combination comprising:

first and second coaxially disposed shafts, said first shaft being positioned within said second shaft, said first and second shafts being connected respectively to said two mechanisms and being individually rotatable about a common longitudinal axis of rotation; and a handle member mounted for rotation about two orthogonal axes which are oriented perpendicularly to said axis of rotation of said first and second shafts.

2. The control mechanism of claim 1 wherein said handle member has a first slot and follower coupling operably connected to said first shaft for rotation thereof and a second slot and follower coupling operably connected to said second shaft for rotation thereof, said first and second slots being orthogonal to one another to resolve the rotation of said handle member into a first component operable to rotate said first shaft and a second component operable to rotate said second shaft.

3. The control mechanism of claim 2 wherein said handle member is mounted for rotation about said two orthogonal axes by orthogonally arranged pivotal mountings.

4. The control mechanism of claim 3 wherein each said follower is a roller.

5. The control mechanism of claim 4 wherein each said slot is formed in the handle member.

6. The control mechanism of claim 3 wherein each said pivotal mounting includes a first ring member and a second ring member; said first ring member being mounted coaxially with said second ring member at an outer side thereof and being pivotable relative to the second ring member about one of the said orthogonal axes.

7. The control mechanism of claim 6 wherein said one orthogonal axis is defined by a first pair of pins mounted in alignment through said first ring member for pivotal connection thereof to said second ring member, said second ring member being rigidly attached to a fixed housing member rotatably supporting said first and second coaxial shafts.

8. The control mechanism of claim 7 wherein said handle member includes a pair of support members, pivotally connected to said first ring member by a second pair of pins, said second pins being aligned relative to each other and defining the other of the said orthogonal axes.

9. The control mechanism of claim 8 wherein at least one of said support members is formed as a bracket to by-pass an associated slot and follower coupling to avoid interference therewith.

10. The control mechanism of claim 8 wherein each of said pins is threaded and has tapered ends seated into correspondingly tapered seats formed in, respectively, said first and second ring members, such that each of said pins can be turned on their threads to eliminate any play between said pins and the respective said seats while still maintaining a low frictional resistance and allowing said handle member to be smoothly moved through a range of positions.

11. The control mechanism of claim 10 wherein each said roller is operatively associated with a respective stub shaft rigidly carried by corresponding support arms fixed, respectively, to said first and second shafts.

12. The control mechanism of claim 11 wherein said orthogonal axes intersect on the longitudinal axis of rotation of said first and second the shafts, each said roller being rotatably mounted about an axis of rotation that projects through said intersection and corresponds to the respective said stub shafts.

13. The control mechanism of claim 12 wherein said handle member has a generally spherical configuration in which the said slots are formed, said handle member having a projecting manual knob so that said handle member may be operatively manipulated.

* * * * *